US006810323B1

(12) United States Patent
Bullock et al.

(10) Patent No.: US 6,810,323 B1
(45) Date of Patent: Oct. 26, 2004

(54) SYSTEM AND METHOD FOR STORING AND USING INFORMATION ASSOCIATED WITH GEOGRAPHIC LOCATIONS OF INTEREST TO A MOBILE USER

(75) Inventors: James Blake Bullock, Gilbert, AZ (US); Axel Fuchs, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 51 days.

(21) Appl. No.: 09/669,192

(22) Filed: Sep. 25, 2000

(51) Int. Cl.[7] .......................... G01C 21/00; G06G 7/78; G08G 1/123; H04Q 7/20

(52) U.S. Cl. ........................ 701/206; 701/208; 701/210; 701/211; 701/300; 340/991; 340/995; 340/996; 455/456; 455/457; 455/459

(58) Field of Search ................................ 701/206, 210, 701/211, 208, 201, 215, 300, 202; 340/991, 993, 996, 989; 455/456, 457, 459

(56) References Cited

U.S. PATENT DOCUMENTS

| | | | | | |
|---|---|---|---|---|---|
| 5,214,757 | A | | 5/1993 | Mauney et al. | 395/161 |
| 5,267,042 | A | | 11/1993 | Tsuchiya et al. | 358/209 |
| 5,289,572 | A | | 2/1994 | Yano et al. | 395/155 |
| 5,424,951 | A | | 6/1995 | Nobe et al. | |
| 5,528,248 | A | | 6/1996 | Steiner et al. | 342/357 |
| 5,648,768 | A | | 7/1997 | Bouve | 340/988 |
| 5,682,525 | A | | 10/1997 | Bouve et al. | 395/615 |
| 5,732,074 | A | | 3/1998 | Spaur et al. | 370/313 |
| 5,933,100 | A | | 8/1999 | Golding | 340/995 |
| 5,938,721 | A | | 8/1999 | Dussell et al. | 701/211 |
| 5,944,769 | A | | 8/1999 | Musk et al. | 701/201 |
| 5,964,821 | A | | 10/1999 | Brunts et al. | 701/201 |
| 5,987,380 | A | * | 11/1999 | Backman et al. | 701/208 |
| 5,991,687 | A | | 11/1999 | Hale et al. | 701/207 |
| 6,023,232 | A | | 2/2000 | Eitzenberger | 340/988 |
| 6,023,241 | A | | 2/2000 | Clapper | 342/190 |
| 6,028,537 | A | | 2/2000 | Suman et al. | 340/988 |
| 6,038,522 | A | | 3/2000 | Manson et al. | 702/150 |
| 6,122,520 | A | * | 9/2000 | Want et al. | 455/456 |
| 6,212,472 | B1 | * | 4/2001 | Nonaka et al. | 701/208 |
| 6,253,151 | B1 | * | 6/2001 | Ohler et al. | 701/208 |
| 6,266,612 | B1 | * | 7/2001 | Dussell et al. | 701/207 |
| 6,266,615 | B1 | * | 7/2001 | Jin | 701/213 |
| 6,278,938 | B1 | * | 8/2001 | Alumbaugh | 701/208 |
| 6,487,495 | B1 | * | 11/2002 | Gale et al. | 701/209 |

FOREIGN PATENT DOCUMENTS

| | | |
|---|---|---|
| EP | 0 995 973 A2 | 4/2000 |
| GB | 2 353 160 A | 2/2001 |
| JP | 10-232135 | 9/1998 |
| JP | 10-281779 | 10/1998 |
| WO | WO 01/01295 A1 | 1/2001 |
| WO | WO 01/69176 A1 | 9/2001 |

* cited by examiner

*Primary Examiner*—William A. Cuchlinski, Jr.
*Assistant Examiner*—Brian J. Broadhead

(57) ABSTRACT

A system (10) for storing and using information associated with geographic locations of interest to a mobile user comprises a mobile apparatus (100) and a remote apparatus (200). The mobile apparatus accepts and transmits information associated with a mobile user's geographic position. The remote apparatus (200) receives the transmitted information, stores the information along with data indicative of the position and time as a waypoint, and allows the user to retrieve and manipulate waypoints. The system is preferably realized as a vehicle information system (20) that allows a vehicle user to store waypoints descriptive of different locations encountered during travel. Each waypoint includes the geographic position of its corresponding location, the time, and may include appended information such as a voice message or a picture. The waypoints are stored in a remote server accessible from both the vehicle and an auxiliary apparatus such as a standard telephone (310) or a personal computer (330). After retrieving a stored waypoint, the user has a number of options, such as receiving navigation instructions, modifying the information associated with the waypoint, and sharing the waypoint with a third party. A method (600) efficiently implements the aforementioned functions and other convenient features.

22 Claims, 7 Drawing Sheets

SYSTEM AND METHOD FOR STORING AND USING INFORMATION ASSOCIATED WITH GEOGRAPHIC LOCATIONS OF INTEREST TO A MOBILE USER

FIELD OF THE INVENTION

The present invention relates to the general subject of mobile information and communication systems. More particularly, the present invention relates to systems and methods for storing and using information associated with geographic locations of interest to a mobile user.

BACKGROUND OF THE INVENTION

At the present time, commercially-available automotive telematics systems include navigation systems, traffic information systems, emergency systems (e.g., the OnStar system currently offered in automobiles manufactured by General Motors, Inc.), and location-based information systems.

In a typical location-based information system, a vehicle user may request information relating to businesses or other establishments from a database at a service center or on local media (e.g., a CD-ROM) within the vehicle. The service center or local media responds by providing the user with a list of establishments located near the user's current location. For example, a driver who is looking for a motel can request information on nearby motels, select a particular motel from a list, and then receive navigation instructions for getting to the motel.

An important shortcoming of those location-based services that employ local media is that the database is not only expensive to acquire, but is often incomplete, inaccurate, and quickly outdated. For those location-based services that employ a service center, the navigation instructions are often quite rudimentary (such systems typically do not provide "turn-by-turn" navigation, but merely a map with a recommended route) and thus of limited assistance to the vehicle user.

In many instances, a vehicle user merely wishes to "mark" a position and have access to it later in order to obtain additional information or to tag information to that position. The prior art includes approaches for allowing a mobile user to store information relating to geographic locations encountered by the user in the course of his travels. For example, U.S. Pat. No. 6,023,241 discloses a handheld apparatus that includes a global positioning system (GPS) receiver and a digital camera for recording and using information associated with geographic locations.

In addition to possessing limited functionality and requiring costly mobile apparatus, none of the known prior art approaches offer significant ease of use and appear to lack flexibility with regard to storing, retrieving, manipulating, and using pertinent data. For example, the prior art approaches do not appear to provide a user with significant options for editing stored information or for sharing stored information with third parties.

What is needed, therefore, is a system and method for storing and using information associated with locations of interest to a mobile user that is economical to implement, easy to use, and that provides a user with a convenient set of options for storing, retrieving, manipulating, and using the stored information. Such an apparatus and method would represent a considerable advance over the prior art.

DETAILED DESCRIPTION OF THE PREFERRED EMBODIMENTS

Description of Preferred Apparatus

Figure 1:
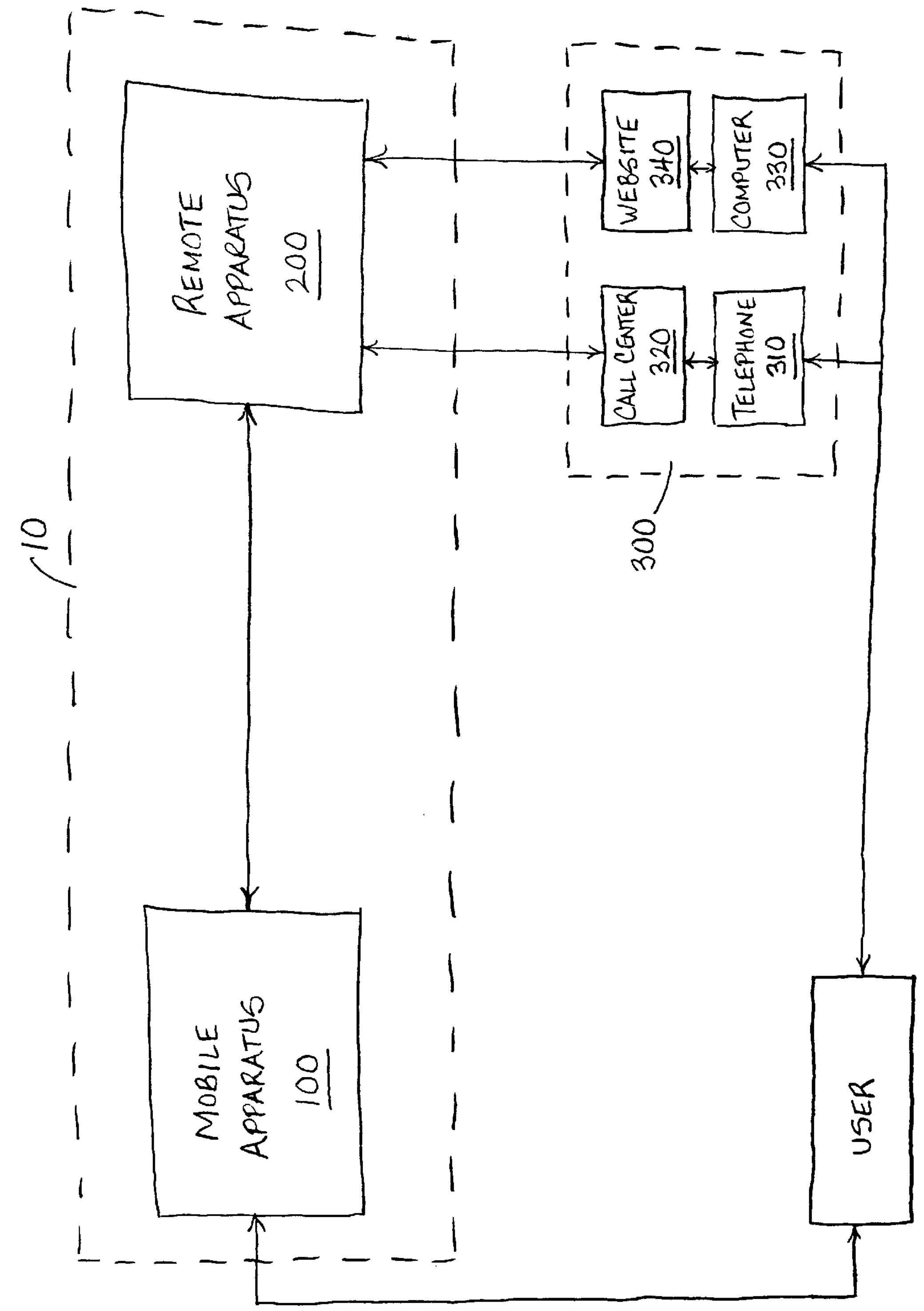
FIG. 1 is a block diagram of an arrangement comprising a mobile apparatus and a remote apparatus, in accordance with a preferred embodiment of the present invention.

FIG. 1 describes an arrangement 10 that includes a mobile apparatus 100 and a remote apparatus 200. During operation, mobile apparatus 100 accepts and transmits information associated with a mobile user's geographic position. This information may include audio information, such as a spoken message composed by the user or an excerpt from a song on the radio, a text message composed by the user (including preprogrammed messages such as "Thanks" and "I will attend," which can be selected by the user), or a visual image representing at least a portion of the environs at the user's geographic position (e.g., a digital photograph). More specific examples of types of information that may be accepted by mobile apparatus 100 are discussed herein (see Examples 1 and 2 below).

Remote apparatus 200 is operably coupled to, and remotely located from, mobile apparatus 100. In a preferred application, mobile apparatus 100 is installed in an automobile, remote apparatus 200 is located at a service-center, and the mobile and remote apparatus communicate with each other via a wireless communication scheme such as two-way radio or cellular telephony.

Remote apparatus 200 receives the information transmitted by mobile apparatus 100 and stores the information, along with data indicative of the mobile user's geographic position and the time, as a waypoint.

Remote apparatus 200 allows the user to retrieve and manipulate the waypoint from both mobile apparatus 100 and an alternative access means 300 that is operably coupled to remote apparatus 200 and remotely located from mobile apparatus 100. Making the waypoints in remote apparatus 200 accessible from means other than just mobile apparatus 100 offers significant convenience and flexibility to a user.

The alternative access means may comprise, for example, a telephone 310 operably coupled to a call center 320, or a personal computer 330 operably coupled to a website 340, wherein call center 320 and website 340 each have access to waypoints stored in remote apparatus 200. The alternative access means may also include other types of devices, such as a Personal Digital Assistant (PDA) or a cellular phone that includes wireless Internet capabilities.

The data indicative of the time and the mobile user's geographic position may each be provided by either the mobile apparatus 100 or the remote apparatus 200. For vehicle applications in which the vehicle is equipped with a global positioning system (GPS) receiver, it is preferred that the time and position data be provided by the mobile apparatus 100, in which case the time and position data will be included in the information transmitted from mobile apparatus 100 to remote apparatus 200. Alternatively, for those applications in which the mobile user lacks a GPS receiver, the time and position data may be supplied by remote apparatus 200. For example, as long as the mobile user has a cellular telephone, remote apparatus 200 may determine the position of the mobile user through a method that utilizes the existing cellular network to ascertain the current position of the mobile user; such a position-determining capability is required by the "911" cellular telephone standard (mandating that the geographical position of a cellular telephone user be available for emergency purposes), and will likely be an essential feature of many cellular telephone services within the next few years.

Preferably, remote apparatus 200 is further operable to determine a street address corresponding to the mobile user's geographic position and to store data indicative of the street address as part of the waypoint. One process by which remote apparatus 200 may determine the corresponding street address is referred to as "reverse geocoding," wherein a pre-existing map database is used to match the coordinates of the position data with a street address, and is well-known to those skilled in the art of mapping, vehicle navigation systems, and related technologies.

Following retrieval of a stored waypoint, remote apparatus 200 preferably provides the user with a number of options for using or manipulating the retrieved waypoint. For example, the user may: (1) request navigation instructions for guiding the user to the geographic position corresponding to the waypoint; (2) modify the waypoint; or (3) make the waypoint available to a third party.

Although mobile apparatus 100 can provide navigation instructions to the mobile user by working in conjunction with a global positioning system independent of remote apparatus 200, it is preferred that the navigation instructions be supplied to mobile apparatus 100 via remote apparatus 200. Having remote apparatus 200 supply the navigation instructions (as compared with having mobile apparatus 100 do so independently of remote apparatus 200) is preferred because it reduces the complexity and/or cost of the hardware associated with mobile apparatus 100; remote apparatus 200 performs the extensive computational tasks that are involved in deriving point-by-point navigation instructions, and then conveys those instructions and associated data to mobile apparatus 100.

The user may modify the waypoint by either appending additional information to the waypoint or by deleting information from the waypoint. For example, the user may wish to append a voice message to the waypoint, or the user may wish to append a voice tag to the waypoint so as to facilitate future retrieval of the waypoint via a spoken command. Alternatively, the user may choose to simply delete the waypoint.

The user has a number of options by which he can make a waypoint available to a third party. First, the user can request that the remote apparatus 200 place a copy of the waypoint in an in-box assigned to third party. For example, a user (say, Bob) may wish to share a previously stored waypoint corresponding to the user's office with a customer (say, Dave) who will be visiting the office. At Bob's command, which can be sent via Bob's mobile apparatus or via an alternative access means such as a telephone or personal computer located at Bob's home or office, the waypoint corresponding to Bob's office will be placed in an in-box assigned to Dave. After retrieving the waypoint from his in-box, Dave can request and receive navigation instructions for guiding him to Bob's office. As a second option, the user can attach a copy of the waypoint to an email message to the third party. As a third option, the user can send a waypoint directly from his mobile apparatus to the mobile apparatus of the third party, without having to pass through or interact with the remote apparatus.

The option of storing waypoints locally within mobile apparatus 100 (as opposed to storing waypoints only in remote apparatus 200) is advantageously employed for those waypoints that the user plans to utilize on a frequent basis. Storing a group of "favorite" waypoints locally within mobile apparatus 100 provides the user with immediate access to those waypoints and also avoids unnecessary frequent communication with remote apparatus 200. For example, a locally stored waypoint can be quickly shared with a third party by direct communication between the user and the third party, and does not require that the user "go through" remote apparatus 200.

An additional preferred feature of remote apparatus 200 allows the user to retrieve and store a waypoint made available to the user by a third party. This feature complements the previously described function of allowing the user to share a waypoint with a third party, and offers similar conveniences. For example, a third party (say, John) may wish to send a previously stored waypoint corresponding to the third party's home to a friend (say, Tom) who is planning to visit. At John's request, which may be sent via John's mobile apparatus or via an alternative access means such as a telephone or a personal computer located at John's home or office, a copy of the waypoint will be placed in an in-box assigned to Tom. After retrieving the waypoint from his in-box, Tom can request and receive navigation instructions for guiding him to John's home. Alternatively, John can attach a copy of the waypoint to an email message to Tom, or can send the waypoint directly from his mobile apparatus to Tom's mobile apparatus.

Figure 2:
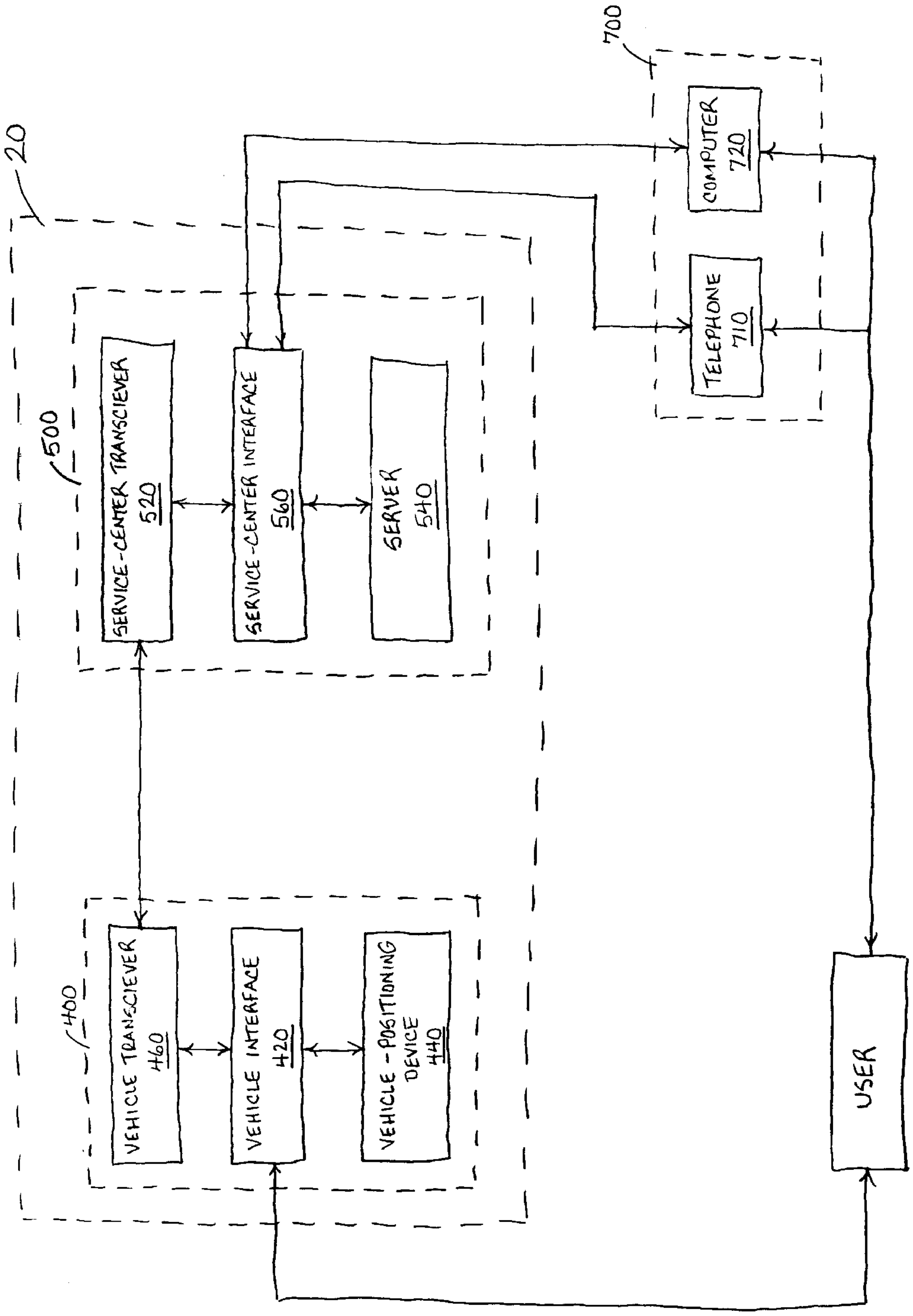
FIG. 2 is a block diagram of a system for storing, processing, and using information associated with geographic locations of interest to a vehicle user, in accordance with a preferred embodiment of the present invention.

FIG. 2 describes a preferred embodiment of the present invention that is specifically intended for use with a vehicle such as an automobile. The embodiment illustrated in FIG. 2 has many of the same attributes previously described with regard to the embodiment of FIG. 1.

As illustrated in FIG. 2, a system 20 for storing, processing, and using information associated with geographic locations of interest to a vehicle user includes an in-vehicle apparatus 400 and a service-center apparatus 500. In-vehicle apparatus 400 and service-center apparatus 500 are analogous, respectively, to mobile apparatus 100 and remote apparatus 200 previously described with regard to FIG. 1.

In-vehicle apparatus 400 comprises a vehicle interface 420, a vehicle positioning device 440, and a vehicle transceiver 460. Vehicle positioning device 440, which is operably coupled to, or part of, a global positioning system, is coupled to vehicle interface 420. Vehicle transceiver 460, preferably realized by a cellular telephone or other device with wireless data communication capabilities, is coupled to vehicle interface 420.

During operation, vehicle interface 420 receives a store command from the vehicle user. In response to the store command, vehicle-positioning device 440 supplies data indicative of the vehicle's geographic position and the current time. Next, vehicle interface 420 prompts the user for descriptive information associated with the location (e.g., a voice tag, voice message, picture, etc.). If the user provides descriptive information, vehicle transceiver 460 will transmit the descriptive information, along with the data pertaining to time and geographic position, to service-center apparatus 500. If the user chooses not to provide descriptive information, vehicle transceiver 460 will transmit only the data pertaining to time and geographic position to service-center apparatus 500.

Preferably, a copy of the information and data for the waypoint is stored locally within vehicle interface 420, in which case vehicle interface 420 includes memory for storing data. Because the waypoint is stored locally, it is not required that vehicle transceiver 460 transmit the information and data to service-center apparatus 500 immediately following the user's store command. Rather, vehicle transceiver 460 may transmit the information and data at a later time, when it is more convenient to do so. For instance, if the vehicle user is in the middle of a conversation on his carphone, and the carphone is the means by which the in-vehicle apparatus and the service-center apparatus communicate, vehicle interface 420 will wait until the carphone becomes available before directing vehicle transceiver 460 to transmit the information and data to service-center apparatus 500. Also, the system may be configured so that, by default or according to the user's preference, vehicle interface 420 will wait until an even later time (e.g., the end of the day, after the vehicle has been parked, during "off-peak" calling hours, etc.) before transmitting the information and data to service-center apparatus 500.

Service-center apparatus 500 is operably coupled to, and remotely located from, in-vehicle apparatus 400. Service-center apparatus 500 includes a service-center transceiver 520, a server 540, and a service-center interface 560.

During operation, service-center transceiver 520, preferably realized by a telephone and modem or other arrangement suitable for communicating voice and data with a mobile cellular phone, receives the information and data transmitted by vehicle transceiver 460. Server 540 is coupled to service-center interface 560 and stores the information and data received by service-center transceiver 520 as a waypoint. Service-center interface 560 is coupled to service-center transceiver 520 and server 540. During operation, service-center interface 560 allows a user to access and manipulate stored waypoints via in-vehicle apparatus 400 and via an auxiliary apparatus (e.g., a telephone or a personal computer) that is remotely located from in-vehicle apparatus 400.

Vehicle interface 420 accepts a user retrieve command requesting retrieval of a waypoint stored in service-center apparatus 500. In response to the user retrieve command, vehicle transceiver 460 transmits a retrieval request to service-center apparatus 500. Service-center apparatus 500 accepts the retrieval request and, in response, transmits the waypoint to vehicle transceiver 460 (as will be described below with regard to a preferred method, additional intervening steps will usually occur between the time that a retrieval request is received by service center 500 and a specific waypoint is sent to in-vehicle apparatus 400). Vehicle transceiver 460 receives the waypoint information and data transmitted by service-center 500. Vehicle interface 420 then conveys the waypoint information to the vehicle user.

The descriptive information associated with the vehicle user's geographic position may consist of any of a large number of types of information. For example, the descriptive information may consist of an audio message composed by the vehicle user (e.g., a voice memo or a voice tag for facilitating quick retrieval of the waypoint by a voice-command from the user), an image representing the environs at the vehicle's geographic position (e.g., a picture taken with a digital camera), an audio excerpt from the vehicle radio (e.g., a song or news bulletin), or some combination thereof. Correspondingly, the in-vehicle apparatus may further include an audio input device (e.g., a microphone) coupled to the vehicle interface and operable to accept a spoken message from the vehicle user or audio information from the vehicle radio, and/or a video input device (e.g., a digital camera or a video camera) coupled to the vehicle interface and operable to form a digital image or video clip associated with the environs at the vehicle's geographic position.

Figure 3:
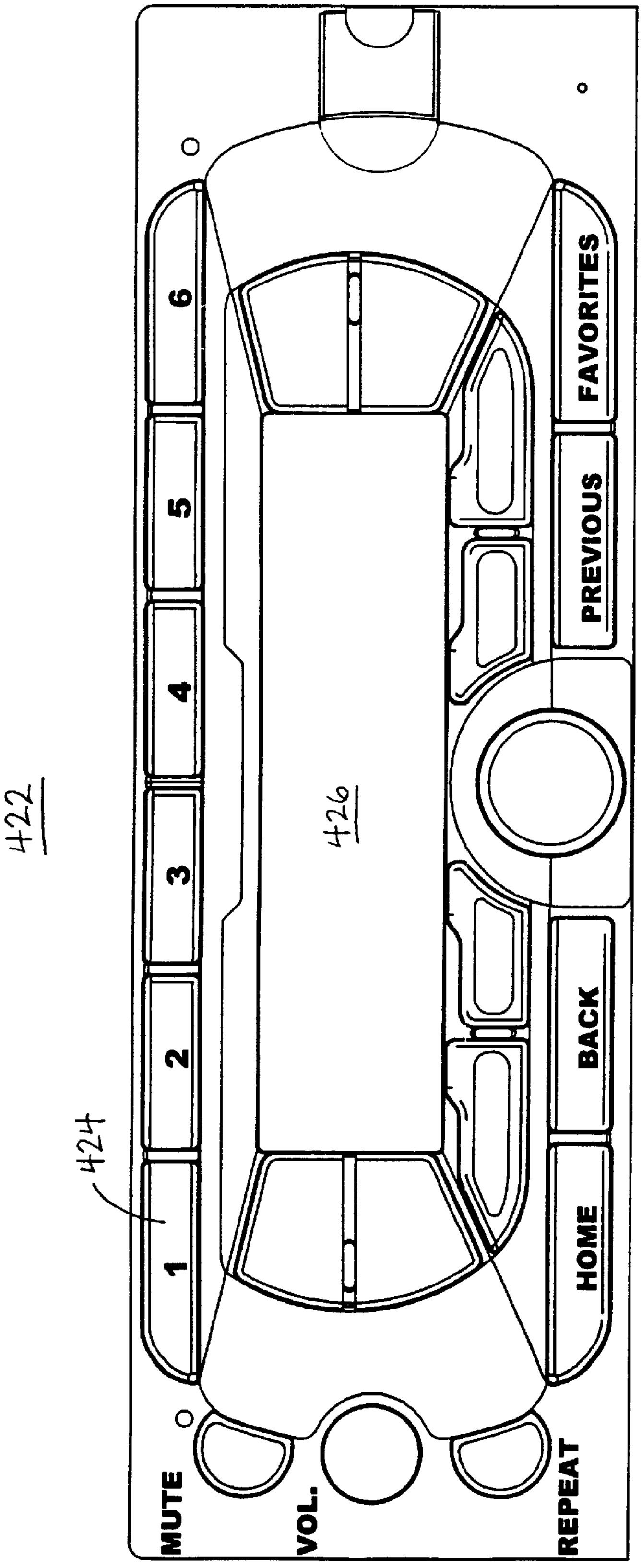
FIG. 3 depicts a faceplate that preferably constitutes a portion of a vehicle input interface of the system described in FIG. 2, in accordance with a preferred embodiment of the present invention.

Vehicle interface 420 includes appropriate hardware for receiving input from, and providing output to, the vehicle user. For example, vehicle interface 420 includes a faceplate 422 (described in FIG. 3) having at least one assignable button 424 by which user commands may be received, and a display 426 for visually conveying information to the user. Display portion 426 may be realized, for example, as a flat panel liquid crystal display. Vehicle interface 420 also includes appropriate software for receiving and executing user commands, as well as associated hardware for storing and running the software. A more detailed description of the preferred functionality of the software for vehicle interface 420 is implied in the description of preferred methods given below.

A user store command may be delivered to the vehicle interface either by pushing an assigned button on faceplate 422 (e.g., a button labeled "STORE"), or by a verbal command (e.g., user says "STORE POSITION"). In order to minimize the required number of buttons assigned to different user commands, vehicle interface 420 may implement a menu system that can be presented on the display portion 426 of faceplate 422. Alternatively, vehicle interface 420 may include a dynamic button labeling scheme wherein the assigned function of a button is described in a region of display portion 426 that is located adjacent to the button, and the assigned function may change after a user command is received (e.g., after user presses a button labeled "STORE", the displayed label for that button changes to "SAVE", thus allowing the same button to be used for both commands).

Optionally, in order to be capable of accepting verbal commands, in-vehicle apparatus 400 will include an audio input device (e.g., a microphone) and vehicle interface 420 will include an appropriate form of voice-recognition software. The audio input device and voice-recognition software may be realized, for example, by apparatus and methods substantially similar to those currently used to provide hands-free operation of a carphone, the details of which are well-known to those skilled in the arts of cellular telephones, telematics systems, and related technologies.

Along similar lines, vehicle interface 420 can convey information to the vehicle user visually, audibly, or both. For example, following retrieval of a waypoint, a summary of the information content of the waypoint can be displayed on the display portion 426 of faceplate 422. Alternatively, a summary of the information content of the waypoint can be audibly read to the vehicle user, in which case the in-vehicle apparatus will include conventional audio hardware, such as an audio amplifier and speaker, as well as appropriate software for translating data into speech.

In addition to being accessible via in-vehicle apparatus 400, the stored waypoints at server 540 may also be accessed by the user from an auxiliary apparatus 700. Auxiliary apparatus 700 may consist of a telephone 710 operably coupled to a telephone call center provided by service-center 560, or a personal computer 720 operably coupled to an Internet website provided by service-center interface 560. Auxiliary apparatus 700 may also include other types of devices, such as a Personal Digital Assistant (PDA) or a cellular phone that includes wireless Internet capabilities.

In a preferred embodiment, in-vehicle apparatus 400 and service-center apparatus 500 provide a number of functions analogous to those previously described with regard to mobile apparatus 100 and remote apparatus 200 in FIG. 1. For example, service-center apparatus 500 is preferably operable to: (1) receive and execute a command from the vehicle user requesting that a waypoint be made available to a third party; (2) allow the vehicle user to receive and manipulate a waypoint made available to the vehicle user by a third party; and (3) determine a street address corresponding to the vehicle's geographic position and include data indicative of the street address as part of the waypoint. Preferably, in-vehicle apparatus 400 is further operable, following retrieval of a waypoint from service-center apparatus 500 and in response to a vehicle user command, to provide the vehicle user with navigation instructions for guiding the vehicle user to the geographic position corresponding to the waypoint. The navigation instructions are preferably supplied to in-vehicle apparatus 400 by service-center apparatus 500.

Because the geographic position data of a waypoint corresponds to the vehicle's position, which is generally not exactly the same as the position of the point-of-interest (e.g., a restaurant, store, etc.) that motivated the user to create the waypoint in the first place, the street address that is provided by reverse geocoding and appended to the waypoint will, in many instances, not be the same as the street address of the intended point-of-interest. This limitation is a consequence of the fact that the reverse geocoding process will match the vehicle's position with an existing street address that is closest (i.e., by straight-line distance) to the vehicle's position. For example, if the user creates a waypoint while his vehicle is located in the parking lot of a strip-mall (e.g., the user is interested in a certain store in the strip mall), the street address that is appended to the waypoint by the service-center apparatus will almost certainly not match the address of the certain store that motivated the creation of the waypoint. Nevertheless, the street address appended to the waypoint will probably be sufficiently close to the address of the intended point-of-interest (e.g., the appended street address will likely correspond to the actual address of another store or business in the strip-mall) to preserve the usefulness of the waypoint. As created, the waypoint will most likely be quite adequate for purposes of later guiding the user or a third party back to the immediate vicinity of the intended point-of-interest. Moreover, the user has the option of later editing the waypoint (e.g., by accessing the service-center website at a later time) to correct the address information by requesting a listing of nearby businesses from a business directory, identifying the intended point-of-interest, and replacing the position and address data in the waypoint with the position and address data of the intended point-of-interest. Thus, any ambiguity or lack of precision in the position or address data of the original waypoint may be easily remedied by the user at a later time.

Description of Preferred Methods

Figure 4:
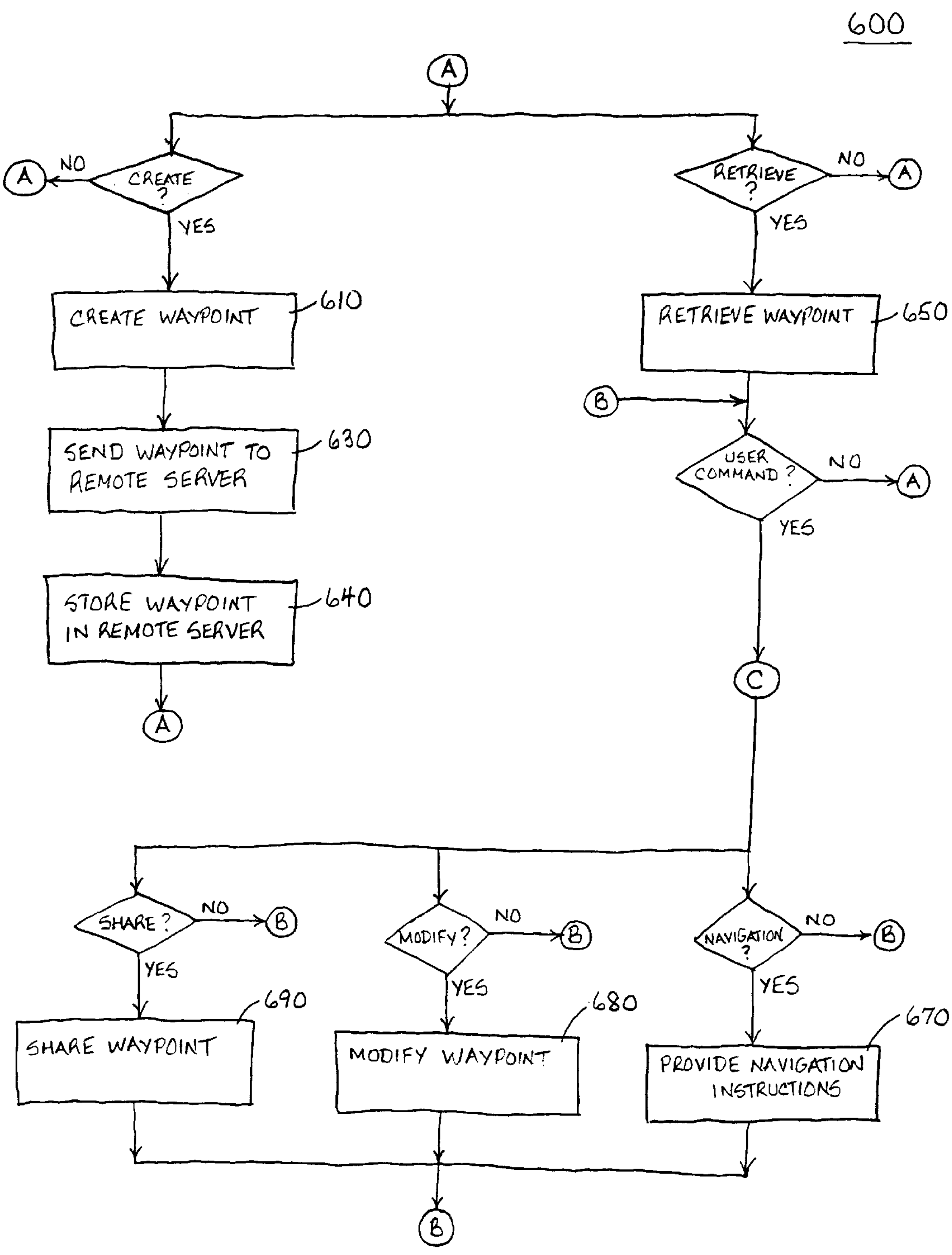
FIG. 4 is a flowchart describing steps of a method of storing and using geographic locations of interest to a mobile user, in accordance with a preferred embodiment of the present invention.

FIG. 4 is flowchart that describes a method 600 of storing and using information relating to geographic locations of interest to a mobile user. Method 600 comprises the steps of: (1) creating a waypoint comprising information relating to the user's current geographic position and the current time (step 610); (2) sending the waypoint to a remote server (step 630); (3) storing the waypoint in the remote server (step 640); and (4) retrieving a stored waypoint in response to a user retrieve command (step 650). Method 600 also includes at least one of the following steps that is performed in response to a user command issued after retrieving a stored waypoint: (6) providing navigation instructions for guiding the user to the geographic position corresponding to the retrieved waypoint (step 670); (7) modifying the retrieved waypoint (step 680); and (8) sharing the retrieved waypoint with a third party (step 690).

Figure 5:
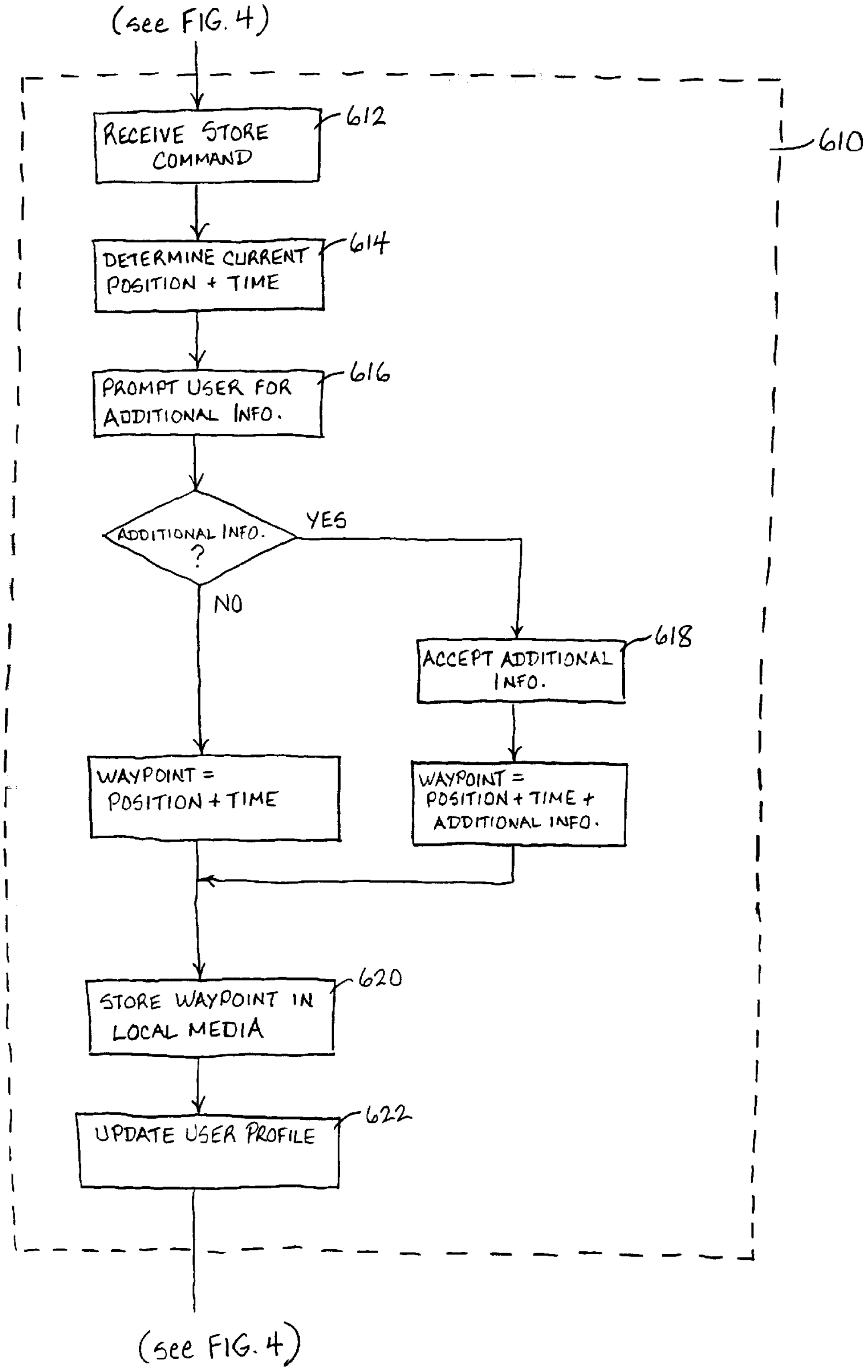
FIGS. 5, 6, and 7 are flowcharts that provide a more detailed description of the steps of the method illustrated in FIG. 4, in accordance with a preferred embodiment of the present invention.

As described in FIG. 5, the step of creating a waypoint (610) preferably includes the following steps: receiving a store command from the user (step 612); determining the user's current geographic position and time (step 614); prompting the user for additional information (step 616); if the user provides additional information, accepting the additional information (step 618); storing the waypoint in local media (step 620); and, updating a user profile to indicate that new data is to be sent to the remote server (step 622).

If additional information (e.g., a message composed by the user, or a visual image relating to the location) is provided in response to the prompt, then the waypoint comprises the additional information in combination with data representative of the geographic position and the time; if, on the other hand, no additional information is provided in response to the prompt, then the waypoint simply comprises data representative of the geographic position and the time.

Steps 620 and 622 are desirable because it may not always be possible or desirable to immediately transmit a newly created waypoint to the remote server. For instance, if a cellular phone is the means by which the waypoint is transmitted to the remote server, but the user is currently using the phone to converse with a third party, the present method will wait until the phone becomes available (i.e., after the user is done talking on the phone) before using it to send the waypoint to the remote server. However, even if the phone is available, it may be preferable to wait until an even later time that is more convenient or cost-effective. For example, the later time may correspond to the next time that the remote server is accessed for other purposes, such as requesting navigation instructions, thereby sparing the expense of a phone call. Alternatively, the later time may correspond to the end of the day (e.g., during "off-peak" hours in the late evening) so that: (1) the billing-rate of the phone call will be lower; and/or (2) if multiple waypoints were created during the course of that day, they can all be sent via a single phone call, rather than placing a separate call for each created waypoint.

Figure 6:
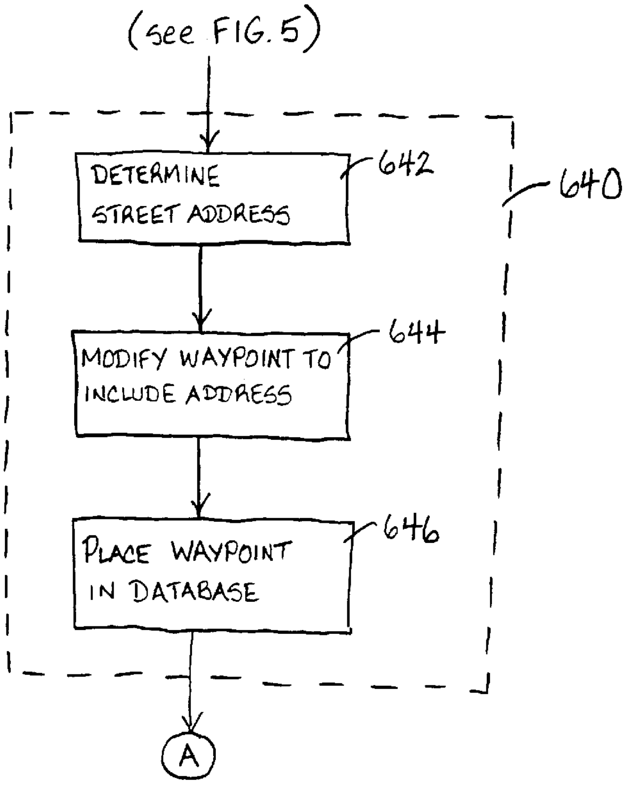

Turning to FIG. 6, the step of storing the waypoint in the remote server (step 640) preferably includes the following steps: determining a street address corresponding to the geographic position of the waypoint (step 642); modifying the waypoint to include data indicative of the street address (step 644); and, storing the waypoint in a database of the remote server (step 646). As previously discussed, the street address may be determined by cross-referencing the coordinates of the geographic position with locations on pre-existing maps stored at the remote server.

Although not illustrated in the flowchart of FIG. 6, step 640 may include additional steps for appending other useful information to the waypoint. For example, step 640 may include the following steps executed between steps 642 and 646: comparing the street address against a list of addresses in an information directory; determining whether the street address matches an address of an entity in the information directory; and, if the street address matches an address of an entity in the directory, modifying the waypoint to include information relating to the entity. For example, the information directory may relate to business establishments and include telephone numbers and brief descriptive information for each business listed therein. To have this type of information automatically appended to the waypoint may prove very convenient to the user upon later retrieval of the waypoint.

Although not illustrated in the flowchart of FIG. 6, step 640 may include an additional step (performed after completion of step 642) of automatically updating the copy of the waypoint previously stored in local media in step 620 (FIG. 5) to include data indicative of the street address, as well as other data appended to the waypoint by the remote server. Alternatively, this step may be omitted, in which case the user will have to retrieve the waypoint stored at the remote server if he wishes to review the information appended to the waypoint by the remote server; following retrieval of the remotely stored waypoint, the user will have the option of updating/replacing the locally stored version of the waypoint with the more complete version retrieved from the remote server.

Figure 7:
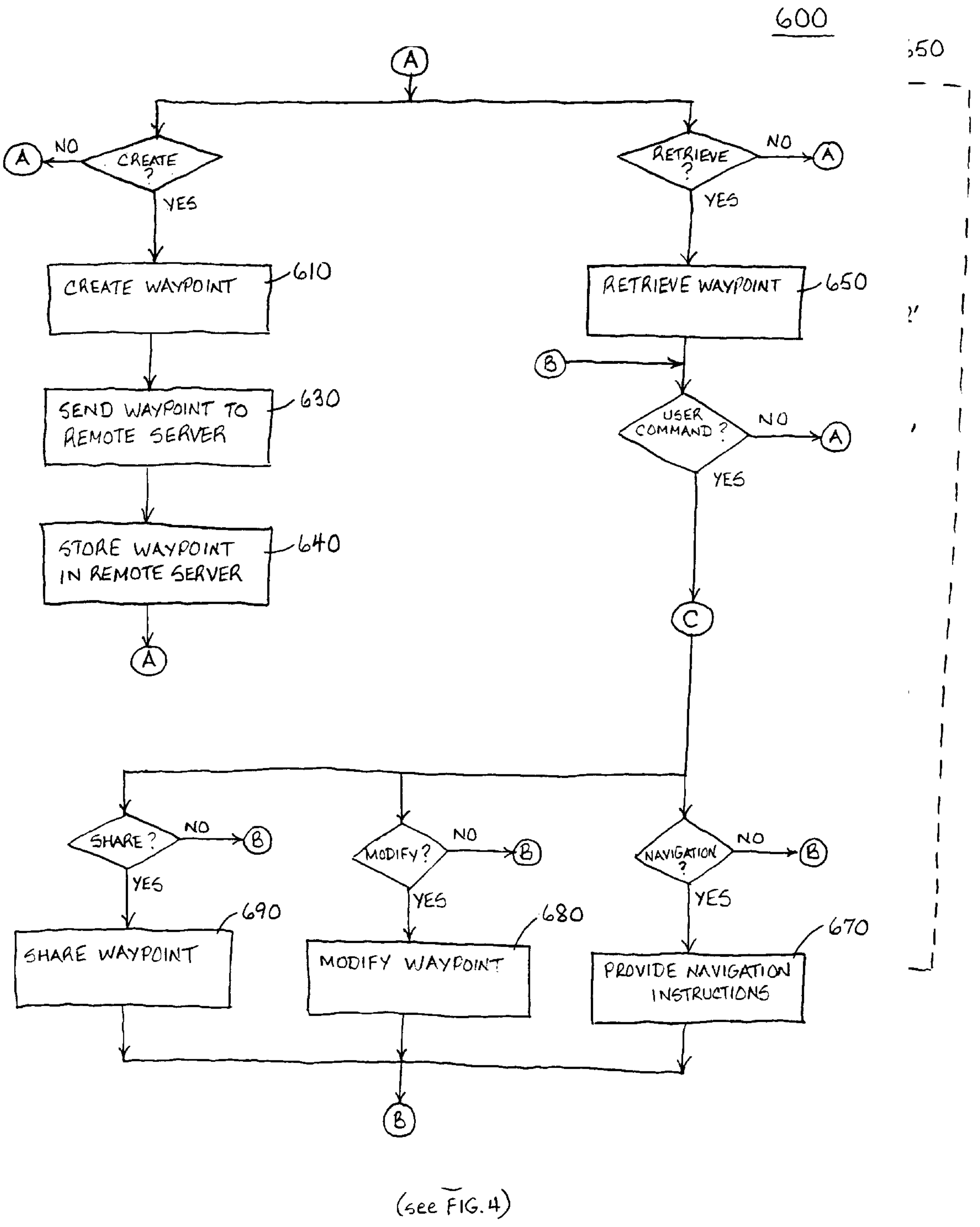

Referring now to FIG. 7, in a preferred embodiment, the step of retrieving a stored waypoint (step 650) may proceed in one of two ways. That is, the user may retrieve a locally stored waypoint (i.e., a waypoint stored on local media within the user's vehicle) or a remotely stored waypoint (i.e., a waypoint stored at the remote server).

The user has the option of retrieving a remotely stored waypoint by either: (i) placing a telephone call to an operator-assisted remote call center (e.g., from the user's carphone or from a standard telephone at the user's home or office); or (ii) logging on to a remote website (e.g., from a web interface on the user's carphone, a Personal Digital Assistance, or a personal computer at the user's home or office).

Considering first the option of retrieving a remotely stored waypoint via a remote call center, step 650 preferably includes the following steps: accepting a user's telephone call to a remote call center having access to the database of the remote server (step 652); presenting a list of stored waypoints to the user (step 654); in response to the user's selection of a specific waypoint from the list of stored waypoints, presenting at least a portion of the information associated with the selected waypoint to the user (step 656); and prompting the user for a command to be executed with regard to the specific waypoint (step 658), wherein the command comprises at least one of the following (referring back to FIG. 4): a user navigation command requesting navigation instructions; a user modify command requesting modification of the information associated with the waypoint; and a user share command requesting that the waypoint be made available to a third party.

In step 654, the list of stored waypoints may be read aloud to the user by an operator (human or computer) at the remote call center; alternatively, or additionally, if the user is calling from within his vehicle, the list of stored waypoints may be presented on a display screen within the vehicle.

In response to user's selection of the navigation command, the call center operator will have navigation instructions corresponding to the selected waypoint transmitted to the user's mobile apparatus.

In response to user's selection of the modify command, the operator will accept additional information dictated or otherwise provided by the user and append it to the waypoint, and then store the modified waypoint in the database of the remote server. For example, the user may dictate a brief message to the operator. Alternatively, the user may transmit a digital photograph or other type of data that he wishes to have appended to the waypoint.

In response to user's selection of the share command, the operator will ask the user for the identity (e.g., the user ID or email address) of the third party and then give the user the option of either: (i) placing a copy of the waypoint in an in-box assigned to the specified third party; or (ii) sending the waypoint to the third party via email.

Referring again to FIG. 7, and considering now the option of retrieving a remotely stored waypoint via a remote website, step 650 preferably includes the following steps: accepting a user's login to a remote website having access to the database of the remote server (step 652'); displaying a list of stored waypoints to the user (step 654'); in response to the user's selection of a specific waypoint from the list of stored waypoints, displaying the information associated with the waypoint (step 656'); and, prompting the user for a command to be executed with regard to the specific waypoint (658), wherein the command comprises at least one of the following (referring back to FIG. 4): a user navigation command requesting navigation instructions; a user modify command requesting modification of the information associated with the waypoint; and a user share command requesting that the waypoint be made available to a third party.

In response to user's selection of the navigation command, navigation instructions corresponding to the selected waypoint will be transmitted to the user's mobile apparatus.

In response to user's selection of the modify command, the website will allow the user to edit the information associated with the waypoint, and then store the modified waypoint in the database of the remote server. For example, the user may add text to the waypoint information, delete portions of the waypoint information, or append other types of information such as a digitized song or photograph.

In response to user's selection of the share command, the website will prompt the user for the identity (e.g., the user ID or email address) of the third party with whom the user would like to share the waypoint and then present the user with several options, such as placing a copy of the waypoint in an in-box assigned to the specified third party, or sending the waypoint to the third party via email.

In addition to providing the user with the aforementioned command options for manipulating or using a waypoint, the website can provide the user with additional useful information and services, such as plotting selected waypoints on a map or describing points of interest (e.g. parks, schools, shopping centers) within a specified vicinity of a selected waypoint. The website gives the user the option of appending this additional information to the waypoint.

In addition to being able to retrieve remotely stored waypoints, method 600 also allows the user to retrieve and select a locally stored waypoint (i.e., one stored on local media and thus immediately accessible to the user), in which case he will be presented with the waypoint information (step 660) and then prompted for a command to be executed with regard to the specific waypoint (step 658).

In response to user's selection of the navigation command, the invehicle apparatus will contact the service-center, and navigation instructions corresponding to the selected waypoint will be transmitted from the service-center to the user's in-vehicle apparatus.

In response to user's selection of the modify command, the in-vehicle apparatus will accept additional information dictated or otherwise provided by the user, append it to the waypoint, store the modified waypoint in local media, and update the user's profile to indicate that new data (i.e., the modifications to the waypoint) is to be sent to the remote server. As in the case of creating a waypoint, the new data will be transmitted to the remote server at a convenient time.

In response to user's selection of the share command, the in-vehicle apparatus will ask the user for the identity (e.g., the user ID) of the third party and then give the user the option of either: (i) requesting that the service-center place a copy of the waypoint in an in-box assigned to the specified third party; or (ii) sending a copy of the waypoint directly from the user's in-vehicle apparatus to the third party's in-vehicle apparatus.

Preferably, method 600 further includes the step of accepting a waypoint made available to the user by a third party. Accepting a waypoint from a third party preferably includes the steps of: modifying the waypoint to include a label that identifies the waypoint as having been sent by a third party; and, storing the modified waypoint along with the user's other stored waypoints. Storing the shared waypoint along with the user's other stored waypoints, as opposed to placing it in a separate location, makes it convenient for the user to promptly access, review, manipulate and/or use the waypoint.

The operation, use, and features of the proposed apparatus and method can be more fully understood through the following two examples.

Example 1

A driver (Jim Jones) notices an interesting restaurant ("Le Francais") off the side of the road. Jim presses a "STORE" button on the vehicle interface in order to mark the location of the restaurant without stopping the car. The vehicle's global positioning system determines the current geographical position of the car and the current time (including the current date), and provides the corresponding data to the vehicle interface. The vehicle interface then prompts Jim for additional information. Jim gives a brief voice message (e.g., "nice looking French restaurant") and then presses a "SAVE" button on the vehicle interface. The vehicle interface then stores the information (geographical position+time+voice message) in memory.

Later that evening, the vehicle interface dials up the service-center using the vehicle's embedded cellular phone. Once a call connection with the service-center is established, the vehicle interface sends the locally stored information (geographical position+time+voice message) over the vehicle phone to the service center.

The service center receives the information, translates the geographic position into the nearest listed street address, attempts to match the street address with information in an online business directory (unfortunately, the street address does not correspond to the address of any establishment in the directory) and stores the information (geographical position+time+voice message+street address) in its server as a waypoint. Before terminating the call with the vehicle phone, the service center transmits the additional information (i.e., street address) to the vehicle interface, which then updates 25 the locally stored waypoint to include the additional information.

Several hours later, while at home, Jim uses his personal computer to log on to a website having access to the service center. The webpage displays a list of waypoints that have been created by Jim. At the top of the list is Jim's most recently created waypoint, which corresponds to the vicinity of the restaurant that Jim noticed earlier in the day. Jim selects the waypoint, and its associated information is displayed on the screen. Jim notices that the waypoint includes a street address (1220 S. Milwaukee Ave., Northbrook, Ill. 60089) but no other information.

The website also provides Jim with the option of reviewing information from an on-line directory that includes businesses and other points-of-interest. Jim uses the on-line directory to search for restaurants located within a quarter-mile radius of the waypoint. The search identifies four restaurants, including "Le Francais," and provides hypertext links to information for each of the four restaurants. Jim selects the link corresponding to "Le Francais" and reviews the displayed information, which includes the street address (1215 S. Milwaukee Ave.), phone number, hours of operation, etc. The webpage presents Jim with the option of creating a new waypoint that includes all of the information for "Le Francais." Jim selects that option and the new waypoint is stored along with Jim's other stored waypoints. Because the original waypoint (i.e., the one that Jim created when he noticed "Le Francais" while driving) is now superfluous, Jim decides to delete it.

Jim also uses the on-line directory to search for a sports bar (he may want to go there to watch a pay-per-view boxing match after dinner, if convenient) that is located within a one-mile radius of the restaurant. The search identifies two sports bars in the area. Jim selects one of the bars ("Shorty's") and opts to create a waypoint corresponding to it. In response, the website stores the new waypoint.

The next day, while driving home from work, Jim decides that that he'd like to make a reservation at "Le Francais" for Friday evening. Jim retrieves the waypoint for "Le Francais" which is now locally stored within the apparatus in his vehicle (in the time since Jim logged onto the server website the previous evening, the new waypoints for "Le Francais" and "Shorty's" have been automatically downloaded and stored in the apparatus within Jim's vehicle), initiates a telephone call by voice command (e.g., "DIAL NUMBER", which asks the apparatus to dial the telephone number of the currently selected waypoint), and makes a reservation for 7:30 PM on Friday evening. Jim decides to add the reservation time to the waypoint by a voice command (e.g., "MODIFY WAYPOINT"). The vehicle interface responds with a prompt ("INFORMATION PLEASE"). Jim dictates a memo (e.g., "Reservation for Friday at 7:30 PM"), followed by a voice command (e.g., "SAVE MEMO"). The vehicle interface attaches the voice memo to the waypoint, locally stores the modified waypoint, and updates the user profile to indicate that new information should be sent to the remote server (i.e., the copy of the waypoint for "Le Francais" that is stored at the remote server will be updated at some later convenient time to include the voice memo).

While driving on Friday evening, Jim again selects the waypoint of the restaurant from his group of locally stored waypoints and the vehicle interface displays a list of options for using or manipulating the waypoint. Jim selects the "GET DIRECTIONS" option. In response, the vehicle cellular phone dials up the service center and transmits a request for navigation instructions. The service responds by providing Jim with point-by-point directions for guiding him from his current position to the restaurant.

Jim arrives at the restaurant, but his friend Karen (who was supposed to meet him at the restaurant) is nowhere to be found. Jim decides to call Karen. Karen answers her carphone and tells Jim that she's lost and has no idea of her current position. Realizing that Karen's car is equipped with the same system as his car, Jim tells Karen that he'll send her a waypoint that she can use to get directions to the restaurant. Jim again selects the waypoint for "La Francais," selects a "SHARE" option, and designates the talking party (i.e., the person whom Jim is currently talking to over the phone) as the recipient. In response, Jim's carphone transmits the waypoint information to Karen's in-vehicle apparatus via Karen's cellular phone.

Karen's vehicle interface informs her that a new waypoint has been received from Jim Jones and presents her with options for using or manipulating the new waypoint. Karen selects the "GET DIRECTIONS" option and begins to receive point-by-point navigation instructions that guide her from her current position to the restaurant.

Example 2

While driving through the neighborhood, a real estate agent (Steve) encounters a house for sale and would like to add the house to his listings for prospective buyers. Steve stops his car and presses the "STORE" button. The vehicle interface prompts Steve for additional information. Steve has a digital camera that is connected to the vehicle interface. Steve takes a digital picture of the house. The picture data is downloaded into the vehicle interface and attached to the other information (i.e., the geographic position and the time). Steve adds a few spoken comments regarding the general appearance and condition of the house, then presses the "SAVE" button. The information (position+time+digital picture+comments) is locally stored as a waypoint in the apparatus within Steve's vehicle, and Steve's user profile is updated to indicate that new information is to be sent to the remote server. Because Steve would like to be able to manipulate the waypoint via the service-center website once he returns to the office (e.g., 15 minutes later), Steve would like to override the default setting that delays uploading of new information to the remote server until "off-peak" hours (e.g., later in the evening). Accordingly, Steve selects a "SEND NOW" command. The data and information of the new waypoint is then transmitted to the service center via Steve's cellular phone.

The service center receives the information, determines the corresponding street address, and stores the information (position+time+digital picture+comments+street address) in the server. The service center then sends the street address data to Steve's vehicle, which appends the street address data to the locally stored copy of the waypoint.

Steve returns to his office, logs onto the service center website, retrieves the waypoint, confirms that the street address corresponds to a listed property (if not, Steve has the option of correcting the address), and copies the information into his real estate listing database. Steve sends a copy of the waypoint, along with a brief message (e.g., "This home may be what you're looking for. Call me if you'd like to view it") and a map (e.g., plotting the location of the waypoint) to several clients via email.

One of the clients, who has a car equipped with a system similar to the one in Steve's car, uses the waypoint attached to Steve's email message to get corresponding navigation instructions and takes a drive by the house recommended by Steve.

Another client (Bob) has a car that isn't equipped with a system similar to the one in Steve's car. However, Bob has a cellular phone with an add-in wireless Internet device attached to the back of the handset. Additionally, Bob is a subscriber of the service-center. Bob receives Steve's email via his cellular phone, opens the attached waypoint, and requests navigation instructions from the service-center by selecting the "GET DIRECTIONS" option. The service-center responds by sending text directions that are displayed on the LCD display of the wireless Internet device. Bob uses the text directions to navigate from his current location to the location of the home recommended by Steve.

Although the present invention has been described with reference to certain preferred embodiments, numerous modifications and variations can be made by those skilled in the art without departing from the novel spirit and scope of this invention. For example, although the foregoing description has focused on applications to automobiles, the apparatus and methods of the present invention are generally applicable to other contexts involving a mobile user (e.g., pedestrians or bicyclists).

What is claimed is:

1. An arrangement comprising:

a first mobile apparatus operable to transmit a waypoint comprising information associated with a first mobile user's current geographic position and to retrieve such information; and a remote apparatus remotely located from, the first mobile apparatus, wherein the remote apparatus is operable to:

receive the waypoint transmitted by the fist mobile apparatus;

store the waypoint transmitted by the first mobile apparatus, the stored waypoint including data indicative of the first mobile user's geographic position;

append the waypoint with a likely address for that geographic position;

allow the first mobile user to retrieve the waypoint;

provide the mobile user a list of addresses and descriptions thereof near the likely address;

receive an indication of the intended address; and replace the position data of the waypoint with the intended address.

2. The arrangement of claim 1, wherein the information associated with the first mobile user's geographic position includes at least one of:

audio information; and a text message composed by the first mobile user.

3. The arrangement of claim 1, wherein the information associated with the first mobile user's geographic position includes a visual image representing at least a portion of the environs at the first user's geographic position.

4. The arrangement of claim 1, wherein the stored waypoint in the remote apparatus further includes data indicative of the time.

5. The arrangement of claim 1, wherein the stored waypoint is stored locally in the mobile apparatus.

6. The arrangement of claim 1, wherein the remote apparatus is operable to display stored waypoints with associated information for retrieval by the mobile apparatus upon selection of a particular waypoint by the mobile user.

7. The arrangement of claim 6, wherein remote apparatus; provides the mobile user with navigation instructions for guiding the mobile user to the geographic position corresponding to the selected waypoint.

8. The arrangement of claim 6, wherein the remote apparatus is further operable to allow the first mobile user to select the waypoint for transmittal to a second mobile user through a command.

9. The arrangement of claim 1, wherein the remote apparatus is further operable to allow the first mobile user to:

(i) append additional information to the waypoint after the waypoint has been stored; and (ii) delete information from the waypoint after the waypoint has been stored.

10. A vehicle information system for storing and using information associated with geographic locations of interest to a mobile user, comprising:

a mobile apparatus operable to:

determine a mobile user's geographic current position and the time;

accept descriptive information associated with the mobile user's geographic position;

store the descriptive information, along with data representative of the mobile user's geographic position and the time, as a waypoint within the mobile apparatus; and transmit a copy of the waypoint; and a remote apparatus remotely located from the mobile apparatus, wherein the remote apparatus is operable to:

receive the copy of the waypoint transmitted by the mobile apparatus, and store the waypoint within the remote apparatus;

append the waypoint with a likely address for that geographic position;

provide the mobile user a list of addresses and descriptions thereof near the likely address;

receive an indication of the intended address;

replace the position data of the waypoint with an intended address;

allow the mobile user to access the waypoint via the mobile apparatus and to select the waypoint for sharing with a third party;

modify the waypoint that was selected for sharing with a third party to include in the waypoint a label that identifies the waypoint as being sent by the mobile user; and send the waypoint to the third party.

11. The vehicle information system of claim 10, wherein:

the remote apparatus is further operable to transmit at least a portion of the data and information of the waypoint back to a third party mobile apparatus; and the third party mobile apparatus is operable to receive and locally store the data and information of the waypoint transmitted by the remote apparatus.

12. A system for storing, processing, and using information associated with geographic locations of interest to a vehicle user, comprising:

an in-vehicle apparatus, comprising:

a vehicle-positioning device operable, in response to a store command from the vehicle user, to supply data indicative of: (i) the vehicle's current geographic position; and (ii) the time;

a vehicle interface coupled to tie vehicle-positioning device and operable, in response to a store command from the vehicle user, to accept descriptive information associated with the vehicle's current geographic position; and a vehicle transceiver coupled to the vehicle interface and operable, in response to the store command, to transmit the descriptive information along with the data indicative of the vehicle's geographic position and the time;

a service-center apparatus remotely located from, the in-vehicle apparatus, the service-center apparatus comprising:

a service-center transceiver operable to receive the information and data transmitted by the vehicle transceiver;

a server operable to store the information and data received from by the service-center transceiver as a waypoint and append the waypoint with a likely address for that geographic position; and a service-center interface coupled to the service-center transceiver and the server, and operable to provide the mobile user a list of addresses and descriptions thereof near the likely address; receive an indication of the intended address; and replace the position data of the waypoint with an intended address; and wherein:

the server is further operable to receive and execute a command from the vehicle user requesting that a waypoint be made available to a third party;

the server is further operable to modify the waypoint to include a label that identifies the waypoint as being sent by the vehicle operator; and the service-center transceiver is further operable to send the waypoint to the third parry in response to receiving the command that the waypoint be made available to the third party.

13. The system of claim 12 further including a third party mobile apparatus, wherein the third party mobile apparatus is operable, following the sending of the waypoint to the third party from the service-center apparatus, to provide the third party with navigation instructions for guiding the third party from the third party's current geographic position to the geographic position corresponding to the waypoint.

14. The system of claim 13, wherein the navigation instructions are sent to the third party mobile apparatus by the service-center apparatus.

15. A method of storing and using information relating to geographic locations of interest, comprising the steps of:

creating a waypoint comprising information relating to a first mobile user's current geographic position;

sending the waypoint to a remote server;

storing the waypoint in a database of the remote server;

modifying the waypoint to include a label that identifies the waypoint as being sent by the first mobile user;

appending the waypoint with a likely address for the waypoint;

providing a list of addresses and descriptions thereof near the likely address;

receiving an indication of the intended address; and replacing the position data of the waypoint with the intended address.

16. The method of claim 15, wherein the step of creating a waypoint includes:

receiving a store command from the first mobile user;

determining the first mobile user's current geographic position and the current time;

prompting the first mobile user for additional information;

if the first mobile user provides additional information, accepting the additional information, wherein:

if the first mobile user provides additional information, the waypoint comprises the additional information in combination with data representative of the geographic position and the time; and if the first mobile user provides no additional information, the waypoint comprises data representative of the geographic position and the time;

storing a copy of the waypoint in a local memory; and updating a user profile to indicate that new data is to be sent to a remote server.

17. The method of claim 16, wherein the additional information comprises at least one of:

audio information; and a visual image relating to at least a portion of the environs at the first mobile user's current geographic position.

18. The method of claim 15, wherein the step of modifying the waypoint includes:

accepting a telephone call from the first mobile user to a remote call center having access to the database of the remote server;

presenting a list of stored waypoints to the fist mobile user;

in response to the first mobile user's selection of a specific waypoint from the list of stored waypoints, prompting the first mobile user for a command to be executed with regard to the specific waypoint, wherein the command comprises at least a user share command requesting that the waypoint be made available to a second mobile user.

19. The method of claim 15, wherein the step of modifying the waypoint includes:

accepting a login from the first mobile user to a remote website having access to the database of the remote server;

displaying a list of stored waypoints to the first mobile user;

in response to the first mobile user's selection of a specific waypoint from the list of stored waypoints, prompting the first mobile user for a command to be executed with regard to the specific waypoint, wherein the command comprises at least a user share command requesting that the waypoint be made available to the second mobile user.

20. The method of claim 15, wherein the step of modifying the waypoint further includes:

accepting a user command requesting modification of the retrieved waypoint;

accepting additional information from the first mobile user and appending the additional information to the waypoint; and storing the modified waypoint in the database of the remote server.

21. The method of claim 15 including thie further steps of:

notifying a second mobile user, from the label in the waypoint, that the waypoint is from the first mobile user; and providing navigation instructions to the second mobile user to guide the second mobile user to the waypoint after sending the waypoint to the second mobile user.

22. A method of receiving, storing, and using information relating to geographic locations of interest to a first and second mobile user, comprising the steps of:

(1) creating a waypoint that includes information relating to the first mobile user's current geographic position and the current time, wherein the step of creating a waypoint comprises the steps of:

(a) receiving a save command from the first mobile user;

(b) determining the first mobile user's current geographic position and the current time;

(c) prompting the first mobile user for additional information; and (d) if the first mobile user provides additional information, accepting the additional information, wherein:

if the first mobile user provides additional information, the waypoint comprises the additional information in combination with data representative of the geographic position and the time; and if the first mobile user provides no additional information, the waypoint comprises data representative of the user's current geographic position and the time;

(e) locally storing a copy of the waypoint; and (f) updating a user profile to indicate that new data is to be sent to a remote server;

(2) sending the waypoint to the remote server;

(3) storing the waypoint in a database of the remote server;

(4) appending the waypoint with a likely address for the waypoint;

(5) providing a list of addresses and descriptions thereof near the likely address;

(6) receiving an indication of the intended address;

(7) replacing the position data of the waypoint with the intended address;

(8) retrieving the waypoint in response to a user retrieve command, comprising the steps of:

(a) presenting a list of saved waypoints to the first mobile user; and (b) in response to the first mobile user's selection of a specific waypoint, prompting the first mobile user for a command to share the waypoint with the second mobile user; and (9) accepting and executing the share command with regard to the specific waypoint selected during the step of retrieving, comprising the steps of:

(a) modifying the waypoint to include a label that identifies the waypoint as being sent by first mobile user;

(b) sending the waypoint to the second mobile user;

(c) providing navigation instructions for guiding the second mobile user to the geographic position corresponding to the waypoint.

* * * * *